(12) United States Patent
Lee

(10) Patent No.: US 11,895,255 B2
(45) Date of Patent: Feb. 6, 2024

(54) ELECTRONIC DEVICE

(71) Applicant: SAMSUNG DISPLAY CO., LTD., Yongin-si (KR)

(72) Inventor: Junghun Lee, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 179 days.

(21) Appl. No.: 17/583,277

(22) Filed: Jan. 25, 2022

(65) Prior Publication Data

US 2022/0321686 A1 Oct. 6, 2022

(30) Foreign Application Priority Data

Apr. 2, 2021 (KR) .................. 10-2021-0043307

(51) Int. Cl.
*H04M 1/00* (2006.01)
*H04M 1/02* (2006.01)

(52) U.S. Cl.
CPC ....... *H04M 1/0268* (2013.01); *H04M 1/0214* (2013.01)

(58) Field of Classification Search
CPC ............. H04M 1/0268; H04M 1/0214; H04M 1/0216; H04M 1/022
See application file for complete search history.

(56) References Cited

U.S. PATENT DOCUMENTS

| 9,552,018 | B2* | 1/2017 | Sato | G06F 1/1626 |
|---|---|---|---|---|
| 9,639,121 | B2 | 5/2017 | Min et al. | |
| 10,185,367 | B2* | 1/2019 | Kim | G06F 1/1675 |
| 10,217,950 | B2 | 2/2019 | Joo et al. | |
| 10,866,472 | B2* | 12/2020 | Shimizu | G02F 1/13458 |
| 11,449,163 | B2* | 9/2022 | Park | H10K 59/88 |
| 11,539,024 | B2* | 12/2022 | Park | H10K 77/111 |
| 11,729,913 | B2* | 8/2023 | Ha | H05K 1/147 |
| | | | | 361/749 |

FOREIGN PATENT DOCUMENTS

| KR | 10-2016-0042288 | 4/2016 |
|---|---|---|
| KR | 10-1743198 | 6/2017 |
| KR | 10-2051803 | 1/2020 |

* cited by examiner

*Primary Examiner* — Nhan T Le
(74) *Attorney, Agent, or Firm* — F. CHAU & ASSOCIATES, LLC

(57) ABSTRACT

An electronic device includes a display panel having non-folding regions arranged along a first direction and a folding region disposed between the non-folding regions. The folding region is foldable along a virtual folding axis extending along a second direction crossing the first direction. The electronic device further includes a support plate disposed on a lower portion of the display panel and having first support lines extending in the first direction, and second support lines extending in the second direction and crossing the first support lines. In the non-folding regions, the first support lines and the second support lines cross each other to define first openings, and in the folding region, the first support lines and the second support lines cross each other to define second openings. An area of each of the first openings is different from an area of each of the second openings.

20 Claims, 11 Drawing Sheets

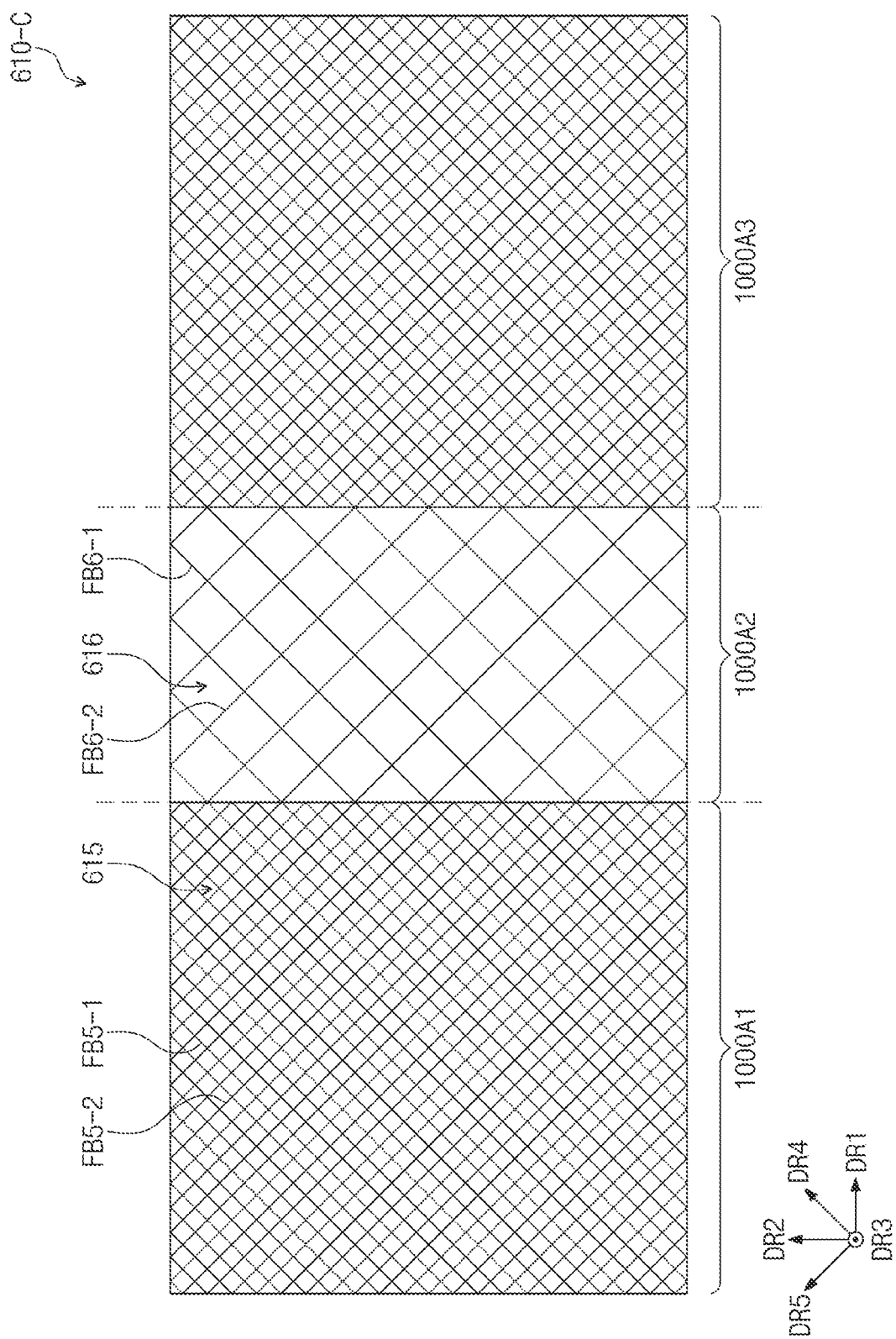

ELECTRONIC DEVICE

CROSS-REFERENCE TO RELATED APPLICATIONS

This application claims priority under 35 U.S.C. § 119 to Korean Patent Application No. 10-2021-0043307, filed on Apr. 2, 2021, the disclosure of which is incorporated by reference herein in its entirety.

TECHNICAL FIELD

Embodiments of the present inventive concept relate to a foldable electronic device.

DISCUSSION OF RELATED ART

An electronic device may include an active region activated in accordance with an electrical signal. The electronic device may sense an input applied from outside of the electronic device through the active region, and at the same time, may display various images to provide information to a user. As electronic devices of various shapes have been developed recently, active regions having various shapes have been implemented.

SUMMARY

Embodiments of the inventive concept provide a display device including a support plate, which may improve folding properties of the display device.

An embodiment of the inventive concept provides an electronic device including a display panel having non-folding regions arranged along a first direction and a folding region disposed between the non-folding regions. The folding region is foldable along a virtual folding axis extending along a second direction crossing the first direction. The electronic device further includes a support plate disposed on a lower portion of the display panel and having first support lines extending in the first direction and second support lines extending in the second direction and crossing the first support lines. In the non-folding regions, the first support lines and the second support lines cross each other to define first openings, and in the folding region, the first support lines and the second support lines cross each other to define second openings. An area of each of the first openings is different from an area of each of the second openings.

In an embodiment, among the second support lines disposed in the folding region, a distance in the first direction between adjacent second support lines is about 50 um to about 150 um.

In an embodiment, among the second support lines disposed in the non-folding regions, a distance in the first direction between adjacent second support lines is 10 um or less.

In an embodiment, a density of the first support lines and a density of the second support lines are relatively higher in the non-folding regions than in the folding region.

In an embodiment, the support plate has a weave shape in which the first support lines and the second support lines are alternately arranged in the first direction and the second direction.

In an embodiment, the support plate includes at least one of polyethylene terephthalate (PET), nylon, acrylic, or spandex.

In an embodiment, the area of the cross-section of each of the first support lines and the area of the cross-section of each of the second support lines is the same.

In an embodiment, an area of the cross-section of each of the first support lines and an area of the cross-section of each of the second support lines is about 50 um to about 200 um.

In an embodiment, the electronic device further includes a cushion member disposed between the display panel and the support plate.

In an embodiment, the electronic device further includes a lower protective film disposed between the display panel and the cushion member.

In an embodiment, the support plate has a plate shape.

In an embodiment of the inventive concept, an electronic device includes a display panel having non-folding regions arranged along a first direction and a folding region disposed between the non-folding regions. The folding region is foldable along a virtual folding axis extending along a second direction crossing the first direction. The electronic device further includes a support plate disposed on a lower portion of the display panel and having a weave shape in which first openings overlapping the non-folding regions and second openings overlapping the folding region are defined. An area of each of the first openings is smaller than an area of each of the second openings.

In an embodiment, the support plate includes first support lines extending in the first direction and second support lines extending in the second direction and crossing the first support lines. The first openings and the second openings are formed by alternately arranging the first support lines and the second support lines in the first direction and the second direction.

In an embodiment, the second support lines are disposed in the non-folding regions and the folding region, and among the second support lines disposed in the folding region, a distance in the first direction between adjacent second support lines is about 50 um to about 150 um.

In an embodiment, among the second support lines disposed in the non-folding regions, a distance in the first direction between adjacent second support lines is about 10 um or less.

In an embodiment, a density of the first support lines and a density of the second support lines are relatively higher in the non-folding regions than in the folding region.

In an embodiment, the support plate includes at least one of polyethylene terephthalate (PET), nylon, acrylic, or spandex.

In an embodiment, a width of the cross-section of each of the first support lines and a width of the cross-section of each of the second support lines is about 50 um to about 200 um.

In an embodiment, the support plate has a plate shape.

In an embodiment, at least one of the first openings and the second openings has a rhombic shape inclined with respect to a plane defined by the first direction and the second direction.

BRIEF DESCRIPTION OF THE DRAWINGS

The above and other features of the present inventive concept will become more apparent by describing in detail embodiments thereof with reference to the accompanying drawings, in which:

FIG. 10 is a plan view of a support plate according to an embodiment of the inventive concept.

DETAILED DESCRIPTION

Figure 1A:
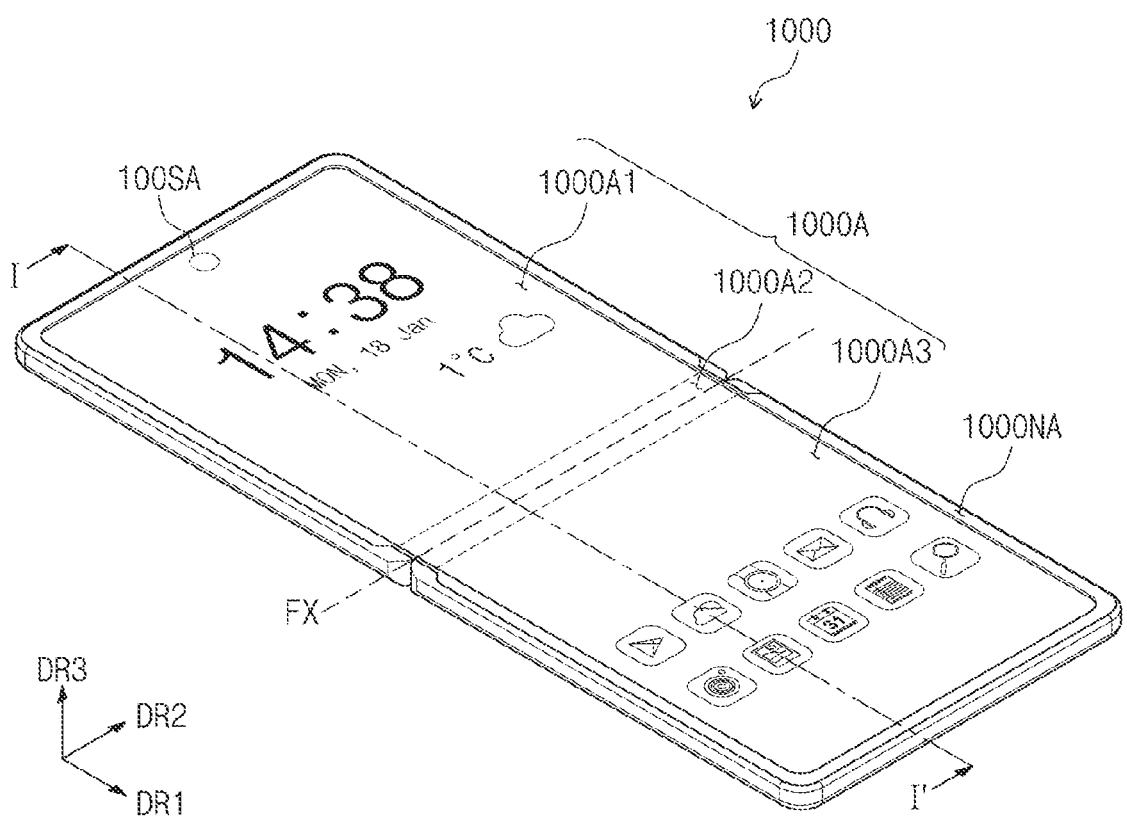
FIG. 1A is a perspective view of an electronic device according to an embodiment of the inventive concept.

Embodiments of the inventive concept will be described more fully hereinafter with reference to the accompanying drawings. Like reference numerals may refer to like elements throughout the accompanying drawings.

In the present disclosure, when an element (or an area, a layer, a portion, etc.) is referred to as being "on," "connected to," or "coupled to" another element, it means that the element may be directly disposed on/connected to/coupled to the other element, or that a third element may be disposed therebetween.

The term "and/or," includes all combinations of one or more of which associated components may define.

It will be understood that, although the terms "first", "second", etc. may be used herein to describe various elements, these elements should not be limited by these terms. These terms are only used to distinguish one element from another. For example, a first element may be referred to as a second element, and a second element may also be referred to as a first element in a similar manner without departing from the scope of the present inventive concept. The terms of a singular form may include plural forms unless the context clearly indicates otherwise.

In addition, terms such as "below," "lower," "above," "upper," etc. are used to describe the relationship of components shown in the drawings. The terms are used as a relative concept and are described with reference to the direction indicated in the drawings.

It should be understood that the terms "comprise" or "have" are intended to specify the presence of stated features, integers, steps, operations, elements, components, or combinations thereof in the disclosure, but do not preclude the presence or addition of one or more other features, integers, steps, operations, elements, components, or combinations thereof.

Herein, when one value is described as being about equal to another value or being substantially the same as or equal to another value, it is to be understood that the values are identical, the values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

As is traditional in the field of the inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

Figure 1B:
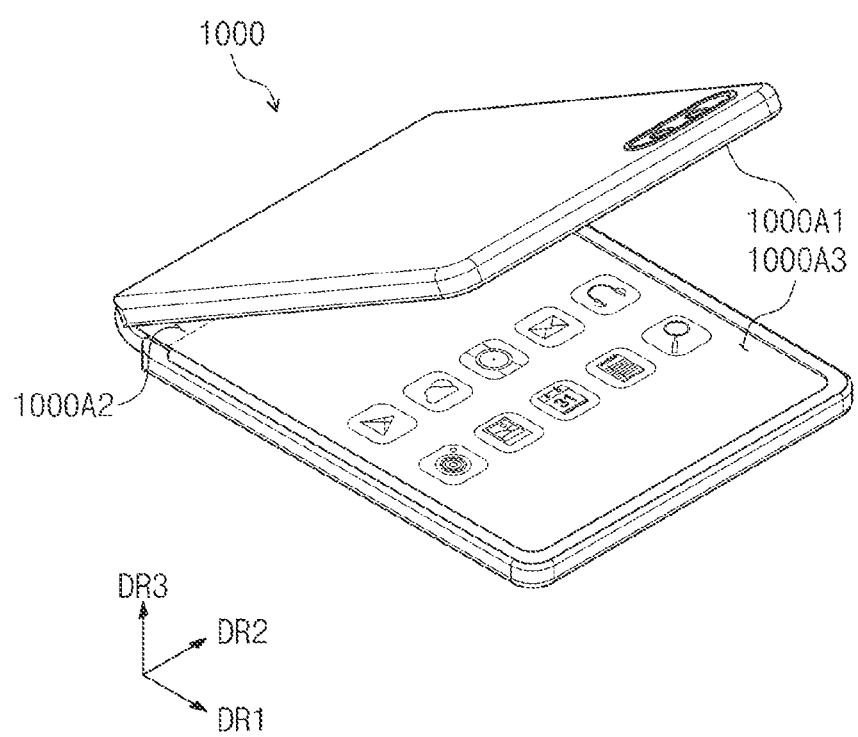
FIG. 1B is a perspective view of an electronic device according to an embodiment of the inventive concept.
Figure 2:
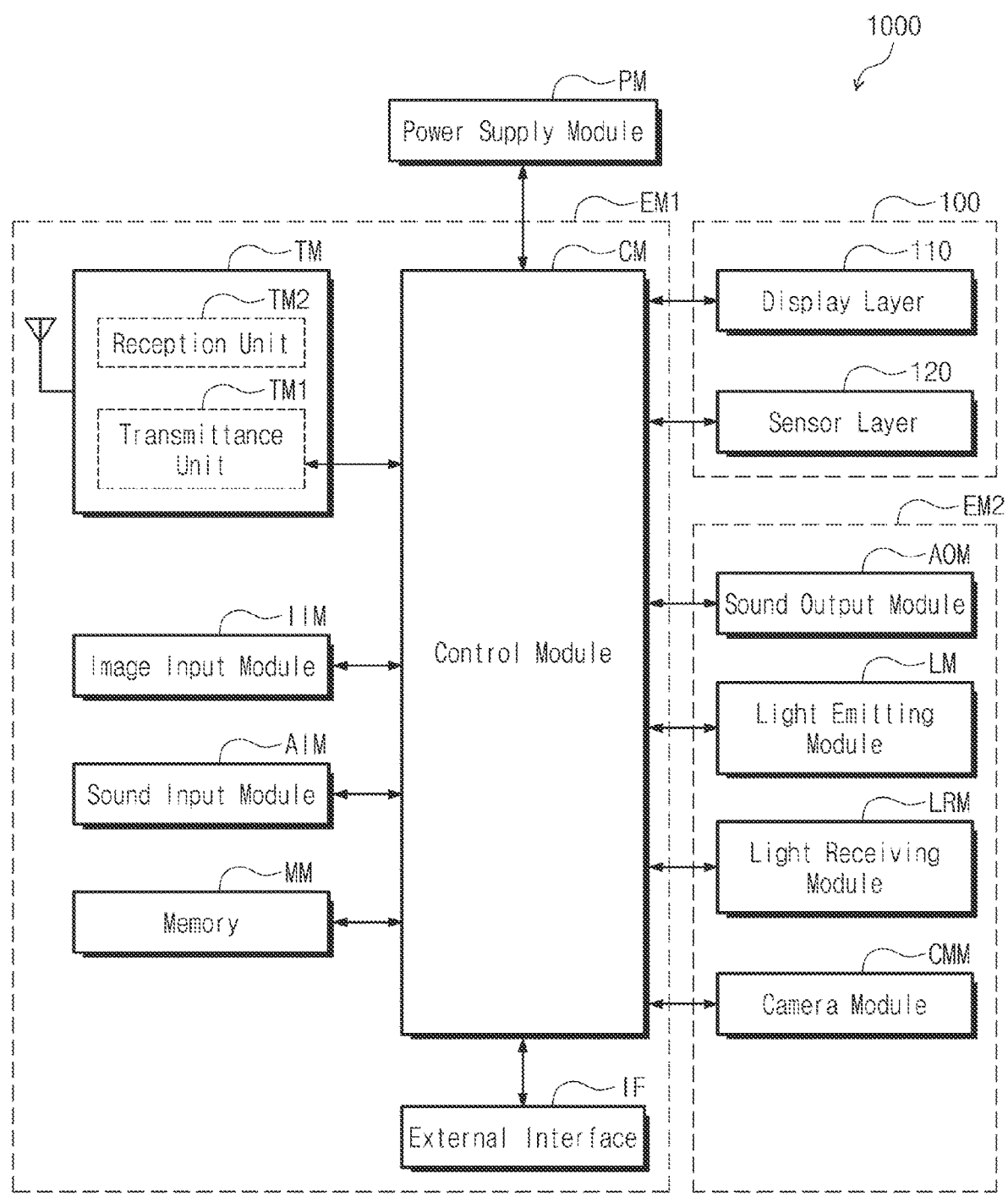
FIG. 2 is a block diagram of an electronic device according to an embodiment of the inventive concept.
Figure 3A:
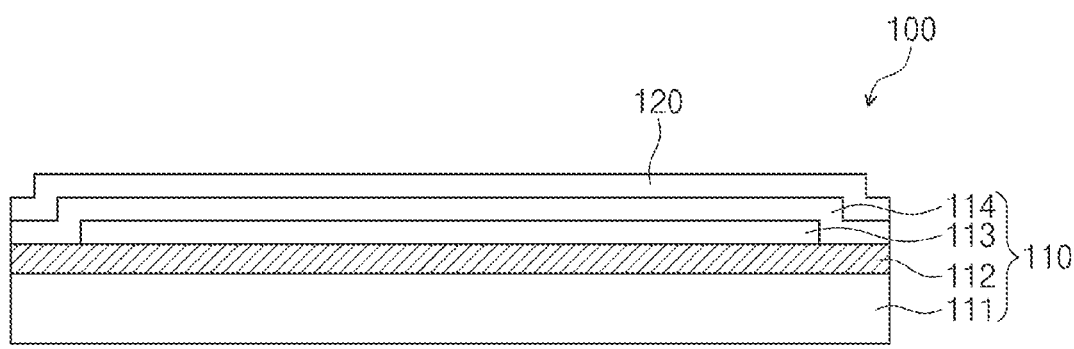
FIG. 3A is a cross-sectional view of a display layer according to an embodiment of the inventive concept.
Figure 3A:
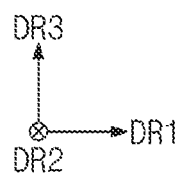
Figure 3B:
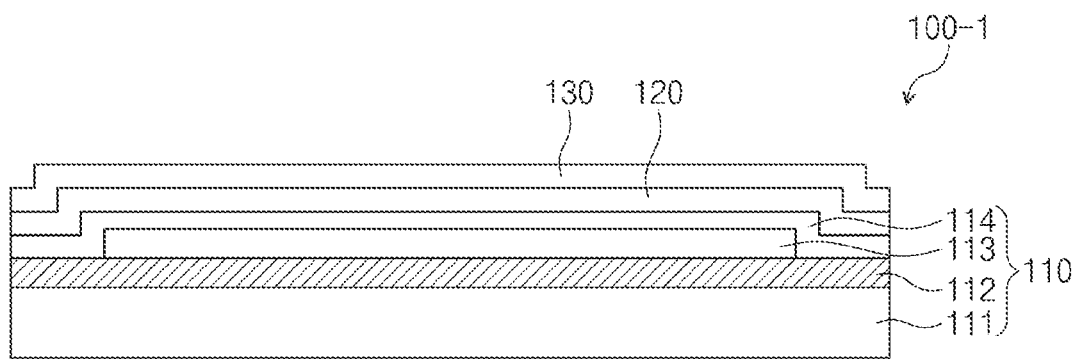
FIG. 3B is a cross-sectional view of a display layer according to an embodiment of the inventive concept.
Figure 3B:
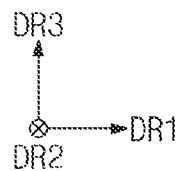

FIG. 1A is a perspective view of an electronic device according to an embodiment of the inventive concept. FIG. 1B is a perspective view of an electronic device according to an embodiment of the inventive concept. FIG. 2 is a block diagram of an electronic device according to an embodiment of the inventive concept. FIG. 3A is a cross-sectional view of a display layer according to an embodiment of the inventive concept. FIG. 3B is a cross-sectional view of a display layer according to an embodiment of the inventive concept.

Referring to FIG. 1A and FIG. 1B, an electronic device 1000 may be a device activated in accordance with an electrical signal. For example, the electronic device 1000 may be a mobile phone, a tablet computer, a car navigation system, a game console, or a wearable device. However, the inventive concept is not limited thereto. In FIG. 1A, the electronic device 1000 is exemplarily illustrated as a mobile phone.

The electronic device 1000 may display an image through an active region 1000A. When the electronic device 1000 is in an unfolded state, the active region 1000A may include a plane defined by a first direction DR1 and a second direction DR2. The thickness direction of the electronic device 1000 may correspond to a third direction DR3 intersecting the first direction DR1 and the second direction DR2. Therefore, a front surface (or an upper surface) and a rear surface (or a lower surface) of members constituting the electronic device 1000 may be defined on the basis of the third direction DR3.

The active region 1000A may include a first region 1000A1 (a non-folding region), a second region 1000A2 (a folding region), and a third region 1000A3 (a non-folding region). The second region 1000A2 may be folded about a folding axis FX extending along the second direction DR2. Therefore, the first region 1000A1 and the third region 1000A3 may be referred to as non-folding regions, and the second region 1000A2 may be referred to as a folding region.

In an embodiment as shown in FIG. 1A, when the electronic device 1000 is folded, the first region 1000A1 and the third region 1000A3 may face each other. Therefore, according to embodiments, in a completely folded state, the active region 1000A is not exposed to the outside. This folding configuration may be referred to as in-folding. However, this is only an example, and the operation of the electronic device 1000 is not limited thereto.

In an embodiment, when the electronic device 1000 is folded, the first region 1000A1 and the third region 1000A3 may oppose each other. Therefore, in a folded state, the active region 1000A may be exposed to the outside. This folding configuration may be referred to as out-folding.

The electronic device 1000 may perform either an in-folding operation or an out-folding operation. Alternatively, the electronic device 1000 may perform both an in-folding operation and an out-folding operation. In this case, the same region of the electronic device 1000, for example, the second region 1000A2, may be in-folded and out-folded. Alternatively, some regions of the electronic device 1000 may be in-folded, and other regions thereof may be out-folded.

In FIG. 1A and FIG. 1B, one folding region and two non-folding regions are exemplarily illustrated. However, the number of folding regions and the number of non-folding regions are not limited thereto. For example, the electronic device 1000 may include a plurality of more than 2 non-folding regions and a plurality of folding regions disposed between non-folding regions adjacent to each other.

In FIG. 1A and FIG. 1B, the folding axis FX is exemplarily illustrated as being parallel to a short axis of the electronic device 1000. However, the inventive concept is not limited thereto. For example, the folding axis FX may extend along a long axis of the electronic device 1000, for example, in the first direction DR1. In this case, the first region 1000A1, the second region 1000A2, and the third region 1000A3 may be sequentially arranged along the second direction DR2.

The electronic device 1000 may include a sensing region 100SA. At least one module which utilizes light may be disposed on a lower portion of the sensing region 100SA.

The sensing region 100SA may overlap a camera module and may overlap a proximity illuminance sensor. However, the inventive concept is not limited thereto. The sensing region 100SA may be completely surrounded by the active region 1000A, or at least a portion of the sensing region 100SA may be surrounded thereby. However, but the inventive concept is not limited thereto.

Referring to FIG. 2, the electronic device 1000 according to an embodiment of the inventive concept may include a display panel 100, a power supply module PM, a first electronic module EM1, and a second electronic module EM2. The display panel 100, the power supply module PM, the first electronic module EM1, and the second electronic module EM2 may be electrically connected to each other.

The display panel 100 may include a display layer 110 and a sensor layer 120. The display layer 110 may be a component which generates an image. An image generated by the display layer 110 may be visually recognized by a user through the active region 1000A.

The first electronic module EM1 and the second electronic module EM2 include various functional modules for operating the electronic device 1000. The first electronic module EM1 may be directly mounted on a motherboard electrically connected to the display panel 100, or may be mounted on a separate substrate and electrically connected to the motherboard through, for example, a connector.

The first electronic module EM1 may include a control module CM, a wireless communication module TM, an image input module IIM, a sound input module AIM, a memory MM, and an external interface IF. In embodiments, some of the modules are not mounted on the motherboard, but instead, may be electrically connected to the motherboard through a flexible printed circuit board.

The control module CM controls the overall operation of the electronic device 1000. The control module CM may be a microprocessor. For example, the control module CM may activate or deactivate the display panel 100. The control module CM may control other modules, such as, for example, the image input module IIM or the sound input module AIM, based on a touch signal received from the display panel 100.

The wireless communication module TM may transmit/receive wireless signals with other terminals using, for example, BLUETOOTH or WIFI. The wireless communication module TM may transmit/receive voice signals using a general communication line. The wireless communication module TM includes a transmittance unit TM1 for modulating and transmitting a signal to be transmitted, and a reception unit TM2 for demodulating a received signal.

The image input module IIM processes an image signal and converts the processed image signal into image data displayable on the display panel 100. The sound input module AIM receives an external sound signal through a microphone in, for example, a recording mode, a voice recognition mode, etc., and converts the received external sound signal into electrical voice data.

The external interface IF serves as an interface to be connected to, for example, an external charger, a wired/wireless data port, a card socket (for example, a memory card, a SIM/UIM card, etc.), etc.

The second electronic module EM2 may include a sound output module AOM, a light emitting module LM, a light receiving module LRM, a camera module CMM, etc. The above components may be directly mounted on the motherboard, or may be mounted on a separate substrate and electrically connected to the display panel 100 through, for example, a connector, or electrically connected to the first electronic module EM1.

The sound output module AOM converts sound data received from the wireless communication module TM or sound data stored in the memory MM, and outputs the converted sound data.

The light emitting module LM generates and outputs light. The light emitting module LM may output an infrared (IR) ray. For example, the light emitting module LM may include an LED element. For example, the light receiving module LRM may sense an infrared ray. The light receiving module LRM may be activated when an infrared ray of a predetermined level or higher is sensed. The light receiving module LRM may include a CMOS sensor. After generated infrared light is output from the light emitting module LM, the infrared light is reflected by an external object (such as a user's finger or face), and the reflected infrared light may be incident on the light receiving module LRM. The camera module CMM captures an external image.

At least a portion of an electronic module according to an embodiment of the inventive concept may be disposed on a lower portion of the display panel 100 to overlap the sensing region 100SA. The electronic module may include at least one of components of the first electronic module EM1 and the second electronic module EM2. For example, the electronic module may include at least one of a camera, a speaker, a light sensing sensor, or a heat sensing sensor.

The electronic module may sense an external object through the sensing region 100SA, or may provide a sound signal such as voice through the sensing region 100SA. In addition, the electronic module may include a plurality of components.

In an embodiment, the electronic device 1000 may further include a transparent member disposed between the electronic module and the display panel 100. The transparent member may be an optically transparent film that allows an external input transmitted through the sensing region 100SA to pass through the transparent member and be transmitted to the electronic module. The transparent member may be bonded to a rear surface of the display panel 100, or may be disposed between the display panel 100 and the electronic module without a separate adhesive layer. The electronic device 1000 according to an embodiment of the inventive concept may have various configurations.

According to an embodiment of the inventive concept, the electronic module may be assembled to overlap the sensing region 100SA included in the active region 1000A on a plane. Accordingly, an increase in the size of a peripheral region 1000NA may be prevented or reduced, thus improving the aesthetics of the electronic device 1000.

FIG. 3A is a cross-sectional view of a display layer according to an embodiment of the inventive concept. FIG. 3B is a cross-sectional view of a display layer according to an embodiment of the inventive concept.

Referring to FIG. 3A, the display panel 100 may be a component that generates an image and senses an input applied from outside of the electronic device 1000. For example, the display panel 100 may include the display layer 110 and the sensor layer 120.

The display layer 110 may be a light-emitting type display layer. For example, the display layer 110 may be an organic light emitting display layer, a quantum-dot display layer, or a micro-LED display layer. However, the display layer 110 is not limited thereto.

The display layer 110 may include a base layer 111, a circuit layer 112, a light emitting element layer 113, and an encapsulation layer 114.

The base layer 111 may include a synthetic resin film. The synthetic resin layer may include a thermosetting resin. The base layer 111 may have a multi-layered structure. For example, the base layer 111 may have a three-layered structure of a synthetic resin layer, an adhesive layer, and a synthetic resin layer.

For example, the synthetic resin layer may be a polyimide-based resin layer. However, the material thereof is not particularly limited. The synthetic resin layer may include at least any one of, for example, an acrylic resin, a methacrylic resin, polyisoprene, a vinyl-based resin, an epoxy-based resin, a urethane-based resin, a cellulose-based resin, a siloxane-based resin, a polyamide-based resin, or a perylene-based resin. In addition, the base layer 111 may include, for example, a glass substrate, an organic/inorganic composite material substrate, etc.

The circuit layer 112 may be disposed on the base layer 111. The circuit layer 112 may include, for example, an insulation layer, a semiconductor pattern, a conductive pattern, a signal line, etc. The insulation layer, a semiconductor layer, and a conductive layer may be formed on the base layer 111 by, for example, coating, deposition, etc. Thereafter, the insulation layer, the semiconductor layer, and the conductive layer may be selectively patterned through performing a photolithography process a plurality of times. Thereafter, the semiconductor pattern, the conductive pattern, and the signal line, all included in the circuit layer 112, may be formed.

The light emitting element layer 113 may be disposed on the circuit layer 112. The light emitting element layer 113 may include a light emitting element. For example, the light emitting element layer 113 may include an organic light emitting material, a quantum dot, a quantum rod, or a micro LED.

The encapsulation layer 114 may be disposed on the light emitting element layer 113. The encapsulation layer 114 may include, for example, an inorganic layer, an organic layer, and an inorganic layer sequentially stacked. However, layers constituting the encapsulation layer 114 are not limited thereto.

The inorganic layers may protect the light emitting element layer 113 from, for example, moisture and oxygen, and the organic layer may protect the light emitting element layer 113 from foreign materials such as, for example, dust particles. The inorganic layers may include, for example, a silicon nitride layer, a silicon oxynitride layer, a silicon oxide layer, a titanium oxide layer, an aluminum oxide layer, etc. The organic layer may include, for example, an acrylic organic layer. However, the inventive concept is not limited thereto.

The sensor layer 120 may be disposed on the display layer 110. The sensor layer 120 may sense an external input applied from outside of the electronic device 1000. The external input may include various forms of inputs provided from the outside of the electronic device 1000. For example, the external input may include not only a contact by a part of a user's body, such as a hand, but also an external input applied in close proximity, or adjacent to the electronic device 1000 at a predetermined distance (for example, hovering). The external input may have various forms such as, for example, force, pressure, and light, but is not limited thereto.

The sensor layer 120 may be formed on the display layer 110 through a series of processes. In this case, the sensor layer 120 may be directly disposed on the display layer 110. Being directly disposed means that a third component is not disposed between the sensor layer 120 and the display layer 110. That is, in an embodiment in which the sensor layer 120 is directly disposed on the display layer 110, a separate adhesive member is not disposed between the sensor layer 120 and the display layer 110.

Alternatively, the sensor layer 120 and the display layer 110 may be coupled to each other by an adhesive member. The adhesive member may include, for example, a typical adhesive or a pressure-sensitive adhesive.

Referring to FIG. 3B, a display panel 100-1 may further include a reflection prevention layer 130. In this case, in the electronic device 1000 (see FIG. 2) including the display panel 100-1, a refection prevention member 200 (see FIG. 4) and a corresponding adhesive layer may be omitted. Hereinafter, for convenience of explanation, redundant descriptions of components and technical aspects previously described may be omitted.

The display panel 100-1 may include the display layer 110, the sensor layer 120, and the reflection prevention layer 130.

The reflection prevention layer 130 according to an embodiment of the inventive concept may include color filters. The color filters may have a predetermined arrangement. The arrangement of the color filters may be determined in consideration of emission colors of pixels included in the display panel 100-1. In addition, the reflection prevention layer 130 may further include a black matrix adjacent to the color filters.

The reflection prevention layer 130 according to an embodiment of the inventive concept may include a destructive interference structure. For example, the destructive interference structure may include a first reflective layer and a second reflective layer disposed on different layers. First reflective light and second reflective light respectively reflected from the first reflective layer and the second reflective layer may be destructively interfered, and accordingly, reflectance of external light may be reduced.

Figure 4:
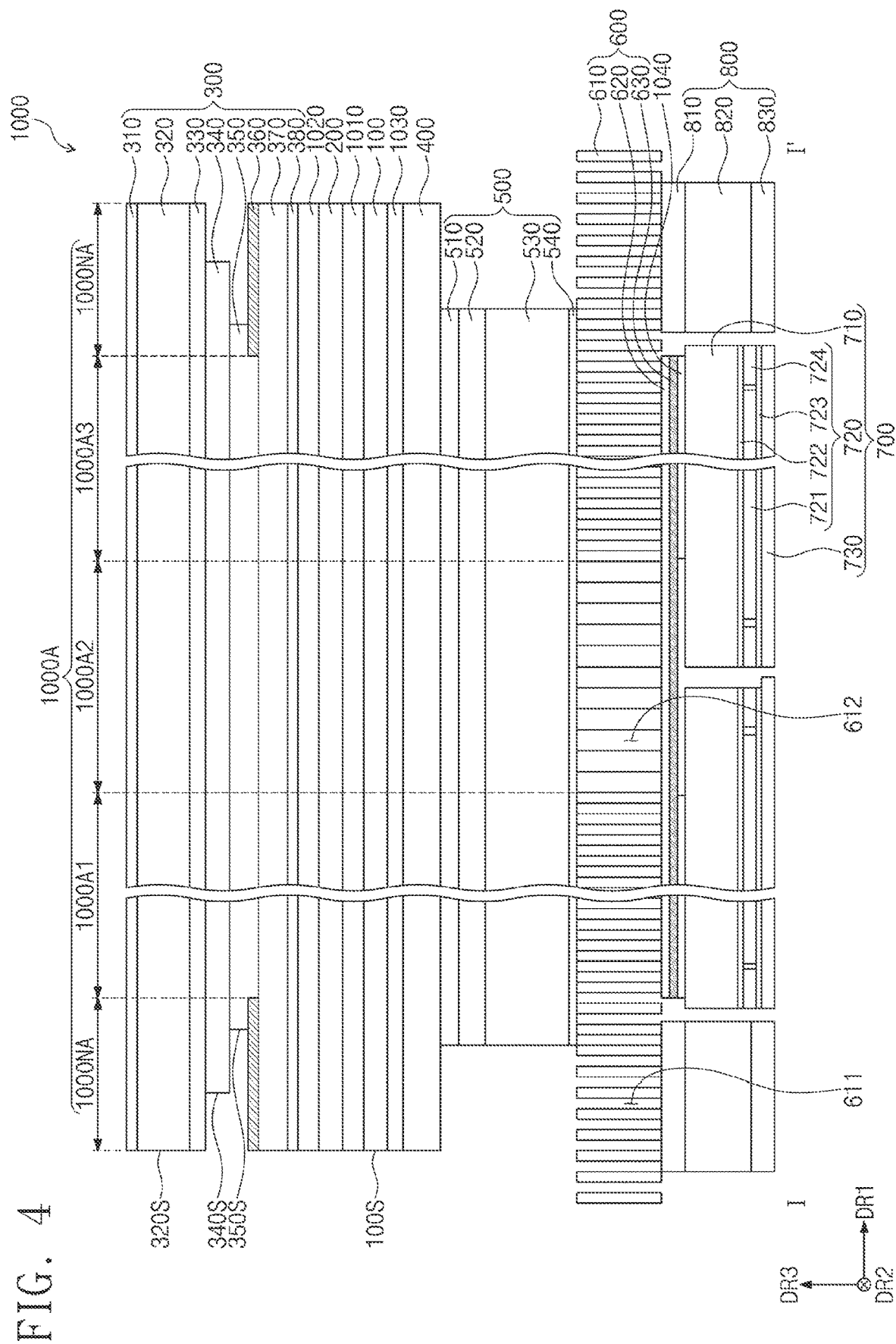
FIG. 4 is a cross-sectional view of an electronic device taken along line I'I' of FIG. 1A according to an embodiment of the inventive concept.

FIG. 4 is a cross-sectional view of an electronic device taken along line IT of FIG. 1A according to an embodiment of the inventive concept.

The electronic device 1000 may include the display panel 100, upper functional layers, and lower functional layers.

The display layer 110 of the display panel 100 described with reference to FIG. 3A and FIG. 3B may generate an image, and the sensor layer 120 of the display panel 100 may sense an input applied from outside of the electronic device 1000.

The display layer 110 may be a light-emitting type display layer. For example, the display panel 100 may include various embodiments in accordance with a light emitting layer included in the display layer 110. For example, the display panel 100 may be any one among a liquid crystal display panel, an electrophoretic display panel, a microelectromechanical system (MEMS) display panel, an electrowetting display panel, an organic light emitting display panel, and an inorganic light emitting display panel. However, the display panel 100 is not limited thereto.

As described with reference to FIG. 3A, the display layer 110 may include the base layer 111, the circuit layer 112, the light emitting element layer 113, and the encapsulation layer 114.

The upper functional layers may be disposed on the display panel 100. For example, the upper functional layers may include a refection prevention member 200 and an upper member 300.

The refection prevention member 200 may be referred to as a reflection prevention layer. The refection prevention member 200 may reduce the reflectance of external light incident from outside of the electronic device 1000. The refection prevention member 200 may include a stretchable synthetic resin film. For example, the refection prevention member 200 may be provided by dyeing a polyvinyl alcohol (PVA) film with an iodine compound. However, this is only an example, and materials constituting the refection prevention member 200 are not limited thereto.

The refection prevention member 200 may be bonded to the display panel 100 through a first adhesive layer 1010. The first adhesive layer 1010 may be a transparent adhesive layer such as, for example, a pressure sensitive adhesive (PSA) film, an optically clear adhesive (OCA) film, or an optically clear (OCR) resin. An adhesive layer described hereinafter may include a typical adhesive or pressure-sensitive adhesive.

In an embodiment of the inventive concept, the first adhesive layer 1010 may be omitted. In this case, the refection prevention member 200 may be directly disposed on the display panel 100. In this case, in an embodiment, a separated adhesive layer is not disposed between the refection prevention member 200 and the display panel 100.

The upper member 300 may be disposed on the refection prevention member 200. The upper member 300 may include a first hard coating layer 310, a protection layer 320, a first upper adhesive layer 330, a window 340, a second upper adhesive layer 350, a light blocking layer 360, an impact absorbing layer 370, and a second hard coating layer 380. Components included in the upper member 300 are not limited to the components described above. According to embodiments, at least some of the components described above may be omitted, and other components not described may be added.

The first hard coating layer 310 may be a layer disposed on the outermost surface of the electronic device 1000. The first hard coating layer 310 is a functional layer which may improve the use properties of the electronic device 1000. The first hard coating layer 310 may be coated on the protection layer 320. For example, due to the first hard coating layer 310, fingerprint prevention/reduction properties, contamination prevention/reduction properties, scratch prevention/reduction properties, etc. may be improved.

The protection layer 320 may be disposed on a lower portion of the first hard coating layer 310. The protection layer 320 may protect components disposed on a lower portion of the protection layer 320. The first hard coating layer 310 and a fingerprint prevention layer may be additionally provided on the protection layer 320, which may improve properties such as chemical resistance and wear resistance. The protection layer 320 may include a film having an elastic modulus of about 15 GPa or lower at room temperature. In an embodiment, the protection layer 320 may be omitted.

The first upper adhesive layer 330 may be disposed on a lower portion of the protection layer 320. The protection layer 320 and the window 340 may be bonded to each other by the first upper adhesive layer 330. The thickness of the first upper adhesive layer 330 may be about 20 micrometers to about 30 micrometers. For example, in an embodiment, the thickness of the first upper adhesive layer 330 may be about 25 micrometers. However, the thickness of the first upper adhesive layer 330 is not limited thereto.

The window 340 may be disposed on a lower portion of the first upper adhesive layer 330. The window 340 may include an optically transparent insulation material. For example, the window 340 may include a glass substrate or a synthetic resin film. When the window 340 is a glass substrate, the thickness of the window 340 may be about 80 micrometers or less, for example, about 30 micrometers. However, the thickness of the window 340 is not limited thereto.

When the window 340 is a synthetic resin film, the window 340 may include, for example, a polyimide (PI) film or a polyethylene terephthalate (PET) film.

The window 340 may have a multi-layered structure or a single-layered structure. For example, the window 340 may include a plurality of synthetic resin films bonded with an adhesive, or a glass substrate and a synthetic resin film bonded with an adhesive.

The second upper adhesive layer 350 may be disposed on a lower portion of the window 340. The window 340 and the impact absorbing layer 370 may be bonded to each other by the second upper adhesive layer 350. The thickness of the second upper adhesive layer 350 may be about 30 micrometers to about 40 micrometers. For example, in an embodiment, the thickness of the second upper adhesive layer 350 may be about 35 micrometers. However, the thickness of the second upper adhesive layer 350 is not limited thereto.

In an embodiment of the inventive concept, a sidewall 340S of the window 340 and a sidewall 350S of the second upper adhesive layer 350 may be disposed further inside of the electronic device 1000 than sidewalls of other layers, for example, a sidewall 100S of the display panel 100 and a sidewall 320S of the protection layer 320. For example, the sidewall 350S of the second upper adhesive layer 350 may be disposed closer to the active region 1000A than sidewalls of other layers, for example, the sidewall 100S of the display panel 100 and the sidewall 320S of the protection layer 320.

Due to a folding operation of the electronic device 1000, the positional relationship between each layer may be changed. According to an embodiment of the inventive concept, since the sidewall 340S of the window 340 is disposed further inside than the sidewall 100S of the display panel 100 and the sidewall 320S of the protection layer 320, even when the positional relationship between each layer is changed, the sidewall 340S of the window is less likely to be protruded more than the sidewall 320S of the protection layer 320 is. Therefore, the likelihood of an external impact being transmitted through the sidewall 340S of the window 340 may be reduced. As a result, a crack is less likely to be generated on the window 340.

The impact absorbing layer 370 may be a functional layer for protecting the display panel 100 from an external impact. The impact absorbing layer 370 may be selected from films having an elastic modulus of about 1 GPa at room temperature. The impact absorbing layer 370 may be a stretchable film having an optical function. For example, the impact absorbing layer 370 may be an optical axis control film. For example, the impact absorbing layer 370 may be a PET film biaxially stretched.

The second hard coating layer 380 may be provided on a surface of the impact absorbing layer 370. The second hard coating layer 380 may include, for example, an organic coating agent, an inorganic coating agent, or an organic/inorganic mixed coating agent, and is not limited to a specific example as long as it is a material capable of reducing haze. Haze may be defined as a degree to which light incident on a test substrate is diffused. When haze is high, it may mean that light is scattered and becomes opaquely blurred.

An upper surface and a lower surface of the impact absorbing layer 370 may include a curved surface. The upper surface of the impact absorbing layer 370 may come into contact with the second upper adhesive layer 350. Therefore, the curvature of the upper surface of the impact absorbing layer 370 may be filled by the second upper adhesive layer 350. Therefore, optical issues such as, for example, an increase in haze on the upper surface of the impact absorbing layer 370, may be reduced. The lower surface of the impact absorbing layer 370 may be planarized by the second upper adhesive layer 350.

The light blocking layer 360 may be disposed between the impact absorbing layer 370 and the second upper adhesive layer 350. The light blocking layer 360 may be disposed (e.g., printed) on the upper surface of the impact absorbing layer 370. The light blocking layer 360 may overlap the peripheral region 1000NA. The light blocking layer 360 is a colored layer, and may be formed in a coating manner. The light blocking layer 360 may include, for example, a polymer resin, and a pigment mixed with the polymer resin. The polymer resin may be, for example, an acrylic resin or polyester, and the pigment may be a carbon-based pigment. However, materials constituting the light blocking layer 360 are not limited thereto.

The light blocking layer 360 may be disposed (e.g., printed) on the impact absorbing layer 370 after the second hard coating layer 380 is formed. Since the surface of the impact absorbing layer 370 is more curved than the second hard coating layer 380, adhesion force may be increased when the light blocking layer 360 is disposed (e.g., printed) on the impact absorbing layer 370 rather than when the light blocking layer 360 is disposed (e.g., printed) on the second hard coating layer 380. That is, in an embodiment, since the light blocking layer 360 is directly disposed (e.g., printed) on the curved surface of the impact absorbing layer 370, the light blocking layer 360 is less likely to be separated from the impact absorbing layer 370. Since the light blocking layer 360 is less likely to be separated from a printing target surface, for example, the impact absorbing layer 370, the product reliability of the electronic device 1000 may increase.

The upper member 3000 may be bonded to the refection prevention member 200 through a second adhesive layer 1020. The second adhesive layer 1020 may include a typical adhesive or a pressure-sensitive adhesive. The thickness of the second adhesive layer 1020 may be about 20 micrometers to about 30 micrometers. For example, in an embodiment, the thickness of the second adhesive layer 1020 may be about 25 micrometers. However, the thickness of the second adhesive layer 1020 is not limited thereto.

The lower functional layers may be disposed on a lower portion of the display panel 100. For example, the lower functional layers may include a lower protective film 400, a cushion member 500, a first lower member 600, second lower members 700, and a step compensation member 800. Components included in the lower functional layers are not limited to the components described above. At least some of the components described above may be omitted, and other components not described above may be added.

The lower protective film 400 may be bonded to a rear surface of the display panel 100 through a third adhesive layer 1030. The lower protective film 400 may prevent scratches from being generated on the rear surface of the display panel 100 during a process of manufacturing the display panel 100. The lower protective film 400 may be a colored polyimide film. For example, the lower protective film 400 may be an opaque yellow film, but is not limited thereto.

The cushion member 500 may be disposed on a lower portion of the lower protective film 400. The cushion member 500 may protect the display panel 100 from an impact transferred from below. The impact resistance properties of the electronic device 1000 may be improved by the cushion member 500.

The cushion member 500 may include a first cushion adhesive layer 510, a barrier film 520, a cushion layer 530, and a second cushion adhesive layer 540. Components included in the cushion member 500 are not limited to the components described above. At least some of the components described above may be omitted, and other components not described above may be added.

The first cushion adhesive layer 510 and the second cushion adhesive layer 540 may include a typical adhesive or a typical pressure-sensitive adhesive. The first cushion adhesive layer 510 may be bonded to the lower protective film 400, and the second cushion adhesive layer 540 may be bonded to the first lower member 600.

The barrier film 520 may increase impact resistance performance. The barrier film 520 may prevent the deformation of the display panel 100. The barrier film 520 may be a synthetic resin film, for example, a polyimide film, but is not limited thereto. The thickness of the barrier film 520 may be about 30 micrometers to about 40 micrometers. For example, in an embodiment, the thickness of the barrier film 520 may be about 35 micrometers. However, the thickness of the barrier film 520 is not limited thereto.

The barrier film 520 may include, for example, foam or a sponge. The foam may include, for example, polyurethane form or thermoplastic polyurethane foam. When the cushion layer 530 includes foam, the cushion layer 530 may be formed using the barrier film 520 as a base layer. For example, the cushion layer 530 may be formed by foaming a foaming agent on the barrier film 520.

At least one of the barrier film 520 and the cushion layer 530 may have a color which absorbs light. For example, at least one of the barrier film 520 and the cushion layer 530 may be black. In this case, components disposed on a lower portion of the cushion member 500 may be prevented from being visually recognized by a user.

The first lower member 600 may be disposed on a lower portion of the cushion member 500. The first lower member 600 may include a support plate 610, a lower adhesive layer 620, and a cover layer 630. Components included in the first lower member 600 are not limited to the components described above. At least some of the components described above may be omitted, and other components not described above may be added.

The support plate 610 may be disposed on a lower portion of the display panel 100. The lower protective film 400 and the cushion member 500 may be disposed between the support plate 610 and the display panel 100. The support plate 610 may increase heat dissipating performance of the electronic device 1000, and may increase impact resistance of the electronic device 1000.

A plurality of first openings 611 overlapping the non-folding regions 1000A1 and 1000A3 may be defined on the support plate 610. In addition, a plurality of second openings 612 overlapping the folding region 1000A2 may be defined on the support plate 610. According to an embodiment of the inventive concept, the first openings 611 and the second openings 612 may have different areas. For example, in an embodiment, the area of each of the second openings 612 may be greater than the area of each of the first openings 611.

According to an embodiment of the inventive concept, the support plate 610 disposed on a lower portion of the display panel 100 includes a plurality of openings 611 and 612 having different areas in the non-folding regions 1000A1 and 1000A3 and in the folding region 1000A2. As a result, when the electronic device 1000 is folded, the shape thereof may be easily changed in the folding region 1000A2. Accordingly, an electronic device 1000 having improved folding properties may be provided.

The cover layer 630 may be bonded to the support plate 610 by the lower adhesive layer 620. The lower adhesive layer 620 may include a typical adhesive or a pressure-sensitive adhesive. The cover layer 630 may cover the openings 611 and 612 of the support plate 610. Therefore, embodiments may additionally prevent foreign matter from entering the openings 611 and 612. The cover layer 630 may include, for example, thermoplastic polyurethane, but is not limited thereto.

The second lower members 700 may be disposed below the first lower member 600. The second lower members 700 may be spaced apart from each other. For example, one second lower member 700 may be disposed in the first region 1000A1, and another second lower member 700 may be disposed in the third region 1000A3.

Each of the second lower members 700 may be bonded to the first lower member 600 by fourth adhesive layers 1040. For example, one fourth adhesive layer 1040 may be bonded on a lower surface of the first lower member 600 overlapping the first region 1000A1, and another fourth adhesive layer 1040 may be bonded on a lower surface of the first lower member 600 overlapping the third region 1000A3. Thus, in an embodiment, the fourth adhesive layers 1040 do not overlap the second region 1000A2.

In an embodiment, a step compensation film may be further disposed between each of the second lower members 700 and the first lower member 600. For example, the step compensation film may be provided in a region overlapping the second region 1000A2. The adhesion force of one surface of the step compensation film may be lower than the adhesion force of another one surface thereof. For example, in an embodiment, the one surface does not have adhesion force. The one surface may be a surface opposing the first lower member 600.

Each of the second lower members 700 may include a lower support plate 710, a heat dissipating sheet 720, and an insulation film 730. Components included in each of the second lower members 700 are not limited to the components described above. At least some of the components described above may be omitted, and other components not described above may be added.

The lower support plate 710 is provided in plurality. In an embodiment, one of the lower support plates 710 may overlap the first region 1000A1 and a portion of the second region 1000A2, and another one of the lower support plates 710 may overlap another portion of the second region 1000A2 and the third region 1000A3. For example, in an embodiment, one of the lower support plates 710 may overlap an entirety of the first region 1000A1 and may overlap a portion less than the entirety of the second region 1000A2, and another one of the lower support plates 710 may overlap an entirety of the third region 1000A3 and may overlap a portion less than the entirety of the second region 1000A2.

The lower support plates 710 may be spaced apart from each other in the second region 1000A2. In an embodiment, the lower support plates 710 may be disposed as close as possible to each other, while still being spaced apart, to support a region in which the first openings 611 of the support plate 610 are formed. For example, the lower support plates 710 may prevent the shape of a region in which the openings 611 and 612 of the support plate 610 are defined from being changed by pressure applied from above.

In addition, the lower support plates 710 may prevent the shapes of components disposed above the second lower members 700 from being changed by components disposed below the second lower members 700.

Each of the lower support plates 710 may include a metal alloy. For example, each of the lower support plates 710 may include a copper alloy. However, materials constituting the lower support plates 710 are not limited thereto.

The heat dissipating sheet 720 may be bonded below the lower support plate 710. The heat dissipating sheet 720 may be a thermally conductive sheet having high thermal conductivity. For example, the heat dissipating sheet 720 may include a heat dissipating layer 721, a first heat dissipating adhesive layer 722, a second heat dissipating adhesive layer 723, and a gap tape 724.

The gap tape 724 may be bonded to the first heat dissipating adhesive layer 722 and the second heat dissipating adhesive layer 723, which are spaced apart from each other with the heat dissipating layer 721 interposed therebetween. The gap tape 724 may be composed of a plurality of layers. For example, the gap tape 724 may include a base layer, an upper adhesive layer disposed on an upper surface of the base layer, and a lower adhesive layer disposed on a lower surface of the base layer.

The heat dissipating layer 721 may be bonded to the lower support plate 710 by the first heat dissipating adhesive layer 722. The heat dissipating layer 721 may be sealed by the first heat dissipating adhesive layer 722, the second heat dissipating adhesive layer 723, and the gap tape 724. The heat dissipating layer 721 may be a graphitized polymer film. The polymer film may be, for example, a polyimide film.

The insulation film 730 may be bonded below the heat dissipating sheet 720. For example, the insulation film 730 may be bonded to the second heat dissipating adhesive layer 723. The occurrence of rattle in the electronic device 1000 may be prevented by the insulation film 730. The thickness of the insulation film 730 may be about 15 micrometers. However, the inventive concept is not limited thereto.

The step compensation member 800 may be bonded below the support plate 610. For example, the lower adhesive layer 620 may be bonded below one portion of the support plate 610, and the step compensation member 800 may be bonded below another portion of the support plate 610.

The step compensation member 800 may include a first compensation adhesive layer 810, a step compensation film 820, and a second compensation adhesive layer 830. The first compensation adhesive layer 810 may be bonded on a lower surface of the support plate 610. The step compensation film 820 may be a synthetic resin film. The second compensation adhesive layer 830 may be bonded on a lower surface of the step compensation film 820.

Figure 5:
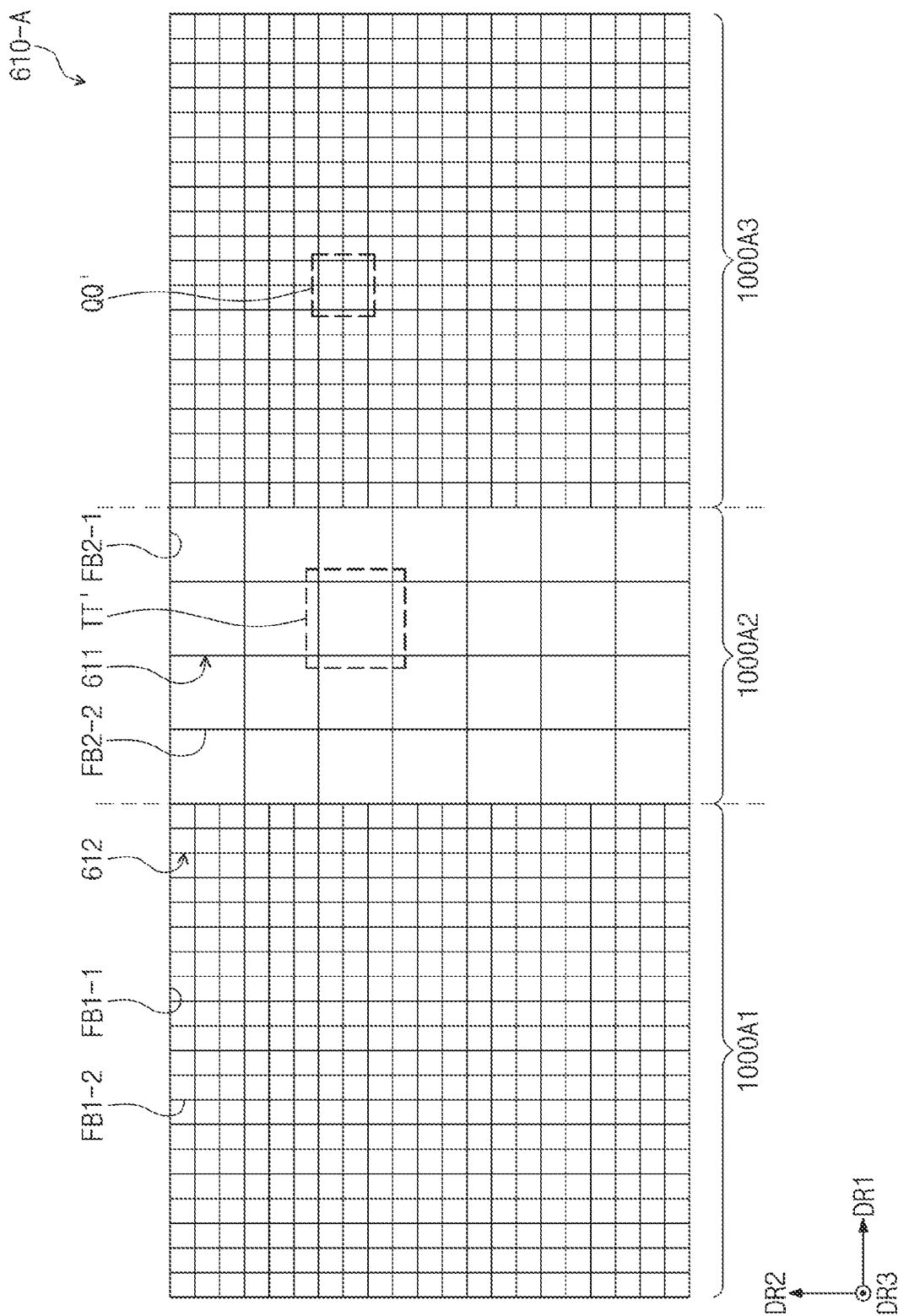
FIG. 5 is a plan view of a support plate according to an embodiment of the inventive concept.
Figure 6A:
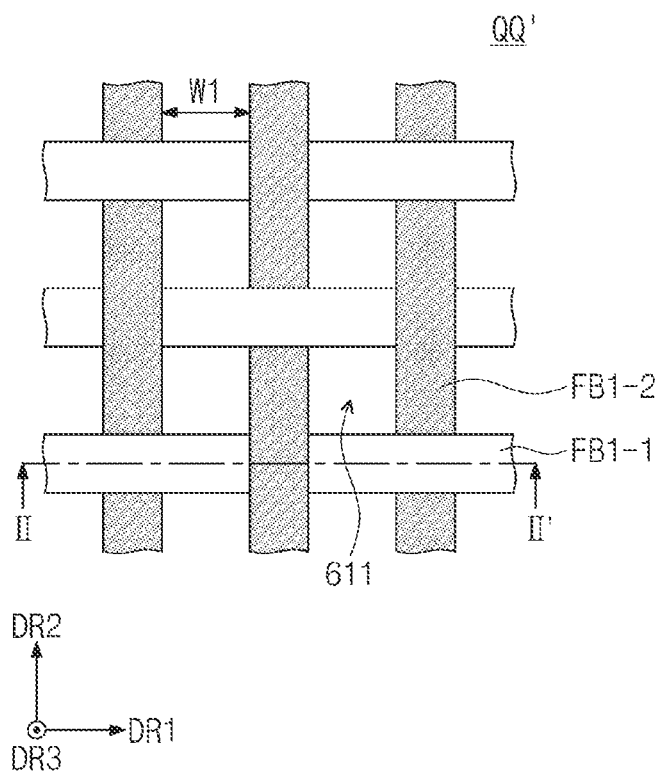
FIG. 6A is a plan view of enlarged region QQ' of FIG. 5 according to an embodiment of the inventive concept.
Figure 6B:
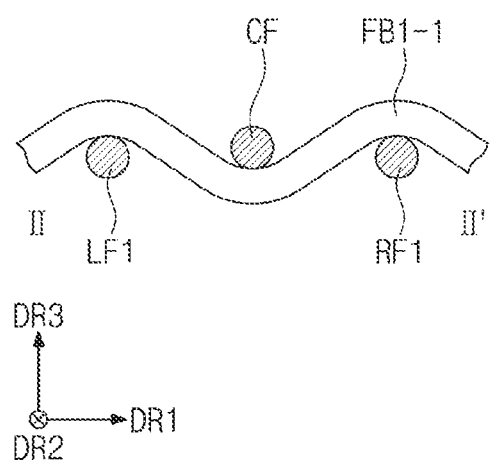
FIG. 6B is a cross-sectional view taken along line II-II' of FIG. 6B according to an embodiment of the inventive concept.
Figure 7A:
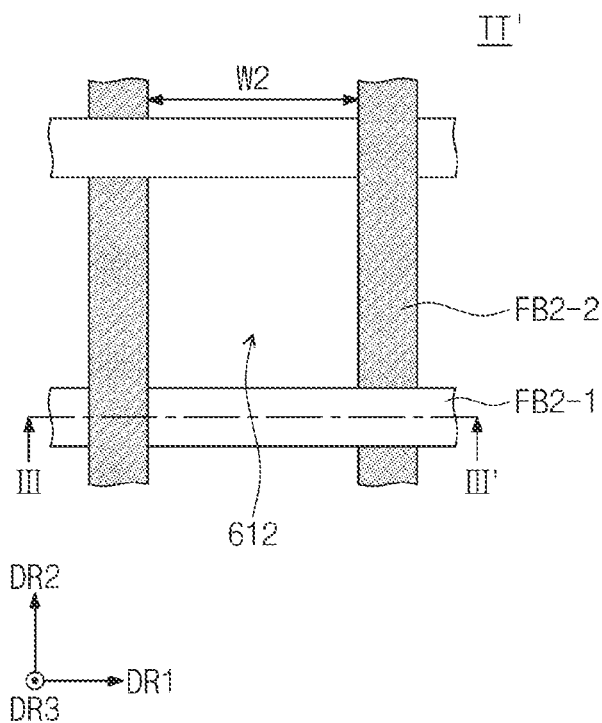
FIG. 7A is a plan view of enlarged region TT' of FIG. 5 according to an embodiment of the inventive concept.
Figure 7B:
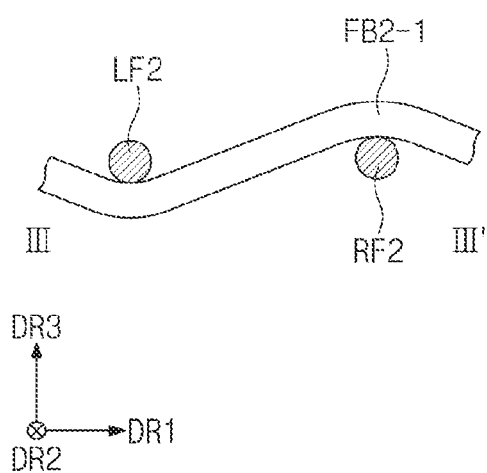
FIG. 7B is a cross-sectional view taken along line of FIG. 7A according to an embodiment of the inventive concept.
Figure 8:
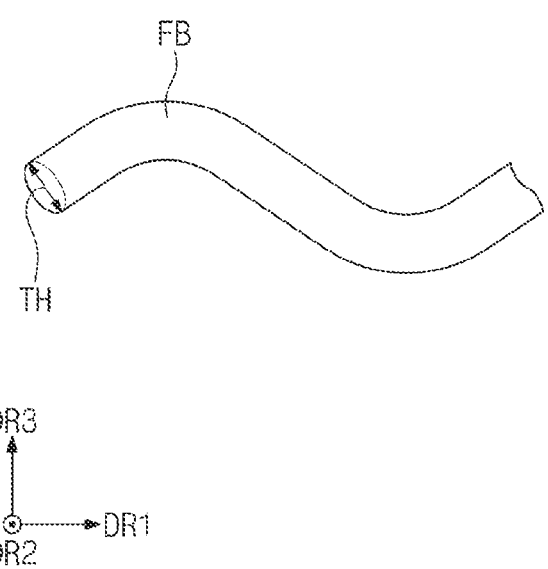
FIG. 8 is a perspective view of one support line according to the inventive concept.

FIG. 5 is a plan view of a support plate according to an embodiment of the inventive concept. FIG. 6A is a plan view of enlarged region QQ' of FIG. 5 according to an embodiment of the inventive concept. FIG. 6B is a cross-sectional view taken along line II-II' of FIG. 6B according to an embodiment of the inventive concept. FIG. 7A is a plan view of enlarged region TT' of FIG. 5 according to an embodiment of the inventive concept. FIG. 7B is a cross-sectional view taken along line of FIG. 7A according to an embodiment of the inventive concept. FIG. 8 is a perspective view of one support line according to an embodiment of the inventive concept. The same/similar reference numerals are used for the same/similar components as those described above with reference to FIG. 1A to FIG. 4, and for convenience of explanation, redundant descriptions thereof are omitted.

Referring to FIG. 5, a support plate 610-A according to an embodiment of the inventive concept may include first support lines FB1-1 and FB2-1 and second support lines FB1-2 and FB2-2. Each of the first support lines FB1-1 and FB2-1 may extend in the first direction DR1, and may be spaced apart from each other along the second direction DR2. Each of the second support lines FB1-2 and FB2-2 may extend in the second direction DR2, and may be spaced apart from each other in the first direction DR1.

The first support lines FB1-1 and FB2-1 and the second support lines FB1-2 and FB2-2 may be alternately arranged along the first direction DR1 and the second direction DR2 and define the plurality of openings 611 and 612.

The first support lines FB1-1 and FB2-1 may be divided into 1-1 support lines FB1-1 and 1-2 support lines FB2-1. The 1-1 support lines FB1-1 may overlap the non-folding regions 1000A1 and 1000A3, and the 1-2 support lines FB2-1 may overlap the folding region 1000A2.

The second support lines FB1-2 and FB2-2 may be divided into 2-1 support lines FB1-2 and 2-2 support lines FB2-2. The 2-1 support lines FB1-2 may overlap the non-folding regions 1000A1 and 1000A3, and the 2-2 support lines FB2-2 may overlap the folding region 1000A2.

The 1-1 support lines FB1-1 and the 2-1 support lines FB1-2 may be alternately arranged in the non-folding regions 1000A1 and 1000A3 and define the first openings 611, and the 1-2 support lines FB2-1 and the 2-2 support lines FB2-2 may be alternately arranged in the folding region 1000A2 and define the second openings 612.

According to an embodiment of the inventive concept, the first support lines FB1-1 and FB2-1 may be disposed with different densities for each of the plurality of the regions 1000A1, 1000A2, and 1000A3 included in the electronic device 1000.

For example, among the first support lines FB1-1 and FB2-1, the density of the 1-1 support lines FB1-1 disposed in the non-folding regions 1000A1 and 1000A3 may be higher than the density of the 1-2 support lines FB2-1 disposed in the folding region 1000A2.

In addition, among the second support lines FB1-2 and FB2-2, the density of the 2-1 support lines FB1-2 disposed in the non-folding regions 1000A1 and 1000A3 may be higher than the density of the 2-2 support lines FB2-2 disposed in the folding region 1000A2.

Thus, in an embodiment of the inventive concept, the density of the first support lines FB1-1 and FB2-1 and the density of the second support lines FB1-2 and FB2-2 are relatively higher in the non-folding regions 1000A1 and 1000A3 than in the folding region 1000A2.

According to an embodiment of the inventive concept, as a result of the first support lines FB1-1 and FB2-1 and the second support lines FB1-2 and FB2-2 being disposed with different densities for each of the plurality of regions 1000A1, 1000A2, and 1000A3, the area of the first openings 611 defined in the non-folding regions 1000A1 and 1000A3 may be less than the area of the second openings 612 defined in the folding region 1000A2 in embodiments of the inventive concept.

Referring to FIG. 6A and FIG. 6B, the support plate 610-A according to an embodiment may have a weave shape.

For example, the 1-1 support lines FB1-1 and the 2-1 support lines FB1-2 disposed in the non-folding regions 1000A1 and 1000A3 may be alternately arranged along the first direction DR1 and the second direction DR2.

That is, when looking at one 1-1 support line FB1-1, among three 2-1 support lines FB1-2, a left-side support line LF1 is disposed on a lower portion of the 1-1 support line FB1-1, a center support line CF is disposed on an upper portion of the 1-1 support line 1-'B1-1, and a right-side support line RF1 is disposed on a lower portion of the 1-1 support line FB1-1. The left-side support line LF1, the center support line CF, and the right-side support line RF1 are spaced apart from each other along the first direction DR1.

In addition, when looking at one 2-1 support line FB1-2, among three 1-1 support lines FB1-1, an upper-side support line is disposed on an upper portion of the 2-1 support line FB1-2, a center support line is disposed on a lower portion of the 2-1 support line FB1-2, and a lower-side support line is disposed on an upper portion of the 2-1 support line FB1-2. The upper-side/center/lower-side support lines FB1-1 are spaced apart from each other along the second direction DR2.

Referring to FIG. 7A and FIG. 7B, the 1-2 support lines FB2-1 and the 2-2 support lines FB2-2 disposed in the folding region and 1000A2 may be alternately arranged along the first direction DR1 and the second direction DR2.

That is, when looking at one 1-2 support line FB2-1, between two 2-2 support lines FB2-2, a left-side support line LF2 is disposed on an upper portion of the 1-2 support line FB2-1, and a right-side support line RF2 is disposed on a lower portion of the 1-2 support line FB2-1. The left-side support line LF2 and the right-side support line RF2 are spaced apart from each other along the first direction DR1.

In addition, when looking at one 2-2 support line FB2-2, between two 1-2 support lines FB2-1, an upper-side support line is disposed on an upper portion of the 2-2 support line FB2-2, and a lower-side support line is disposed on a lower portion of the 2-2 support line FB2-2. The upper-side/lower-side support lines FB2-1 are spaced apart from each other along the second direction DR2.

In an embodiment, the support plate 610-A may include any one among, for example, polyethylene terephthalate (PET), nylon, acrylic, and spandex.

According to an embodiment of the inventive concept, among the second support lines FB1-2 and FB2-2, a first distance W1 (see FIG. 6A) in the first direction DR1 between two adjacent (e.g., directly adjacent) second support lines FB1-2 may be less than a second distance W2 (see FIG. 7A) in the first direction DR1 between two adjacent (e.g., directly adjacent) second support lines FB2-2.

According to an embodiment of the inventive concept, the first distance W1 may be about 10 um or less, and the second distance W2 may be about 50 um to about 150 um.

Thus, in an embodiment of the inventive concept, among the second support lines FB2-2 disposed in the folding region 1000A2, the second distance W2 in the first direction DR1 between adjacent (e.g., directly adjacent) second support lines FB2-2 is about 50 um to about 150 um, and among the second support lines FB1-2 disposed in the non-folding regions 1000A1 and 1000A3, a distance in the first direction DR1 between adjacent second support lines FB1-2 is about 10 um or less.

When the second distance W2 is less than about 50 um, there may be an insufficient difference between the area of the first openings 611 and the area of the second openings 622, and as a result, an effect of improving folding properties may be insufficient. In addition, when folding, there may be a crack generated on the support plate 610-A overlapping the folding region 1000A2.

When the second distance W2 is greater than about 150 um, the second openings 612 may be visually recognized by a user, and foreign matter may enter between the second openings 612.

One support line FB among the support lines FB1-1, FB2-1, FB2-1, and FB2-2 in accordance with an embodiment of the inventive concept is illustrated.

When alternately arranged, each of the support lines FB1-1, FB2-1, FB2-1, and FB2-2 in accordance with an embodiment of the inventive concept are disposed forming valleys and ridges along a support line disposed in the upper and lower portions thereof.

Referring to FIG. 8, the support line FB according to an embodiment of the inventive concept may include a circular shape or an elliptical shape on a cross-section thereof. A width TH of a surface exposed on the cross-section of the support line FB may be about 50 um to about 200 um. When the width TH is less than about 50 um, the display panel 100 may not be adequately supported, and when the width TH is greater than about 200 um, the shape of the support plate 610-A may not be easily changed.

Figure 9:
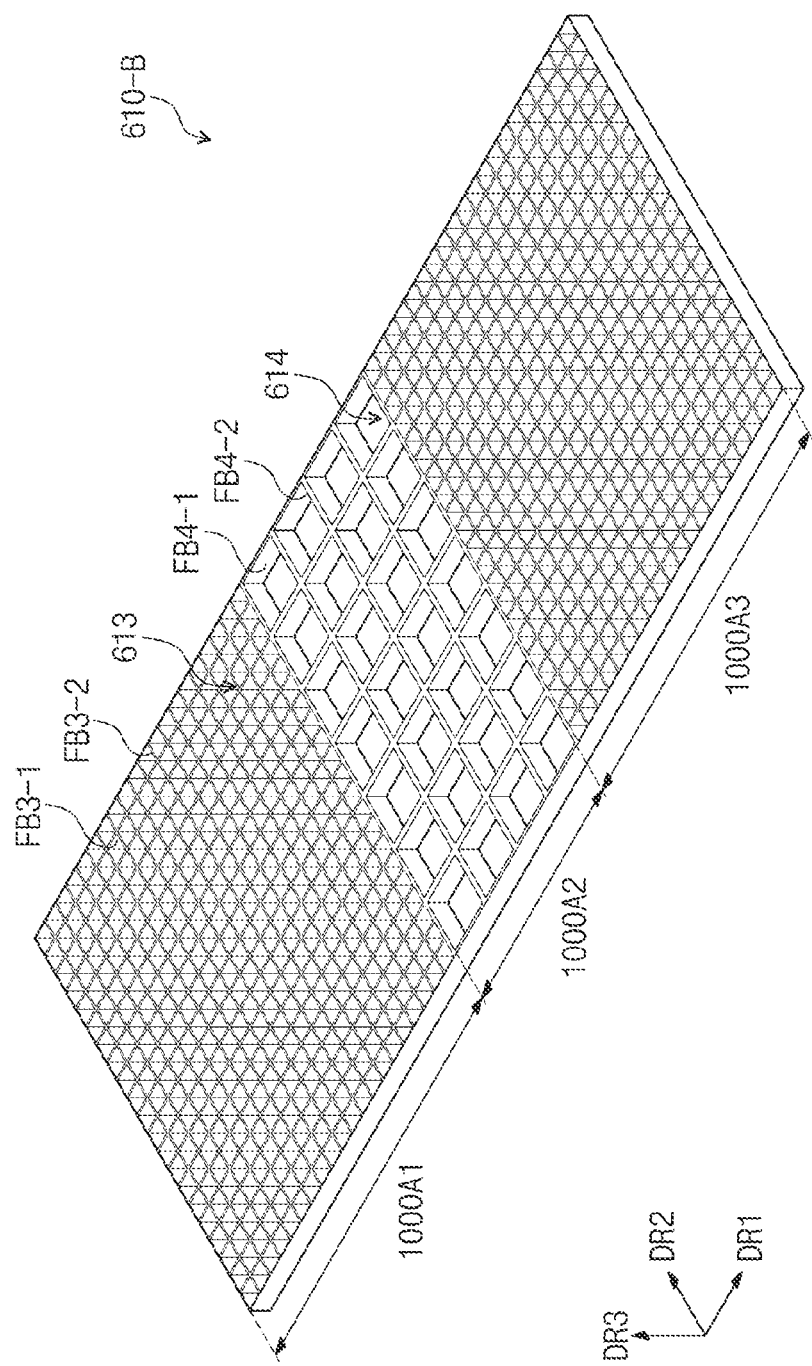
FIG. 9 is a plan view of a support plate according to an embodiment of the inventive concept.

FIG. 9 is a plan view of a support plate according to an embodiment of the inventive concept. The same/similar reference numerals are used for the same/similar components as those described with reference to FIG. 1A to FIG. 5, and for convenience of explanation, redundant descriptions thereof are omitted.

A support plate 610-B according to an embodiment may be provided in a plate shape extending along the first direction DR1 and the second direction DR2.

The support plate 610-B may include first support lines FB3-1 and FB4-1 and second support lines FB3-2 and FB4-2. Each of the first support lines FB3-1 and FB4-1 may extend in the first direction DR1, and may be spaced apart from each other along the second direction DR2. Each of the second support lines FB3-2 and FB4-2 may extend in the second direction DR2, and may be spaced apart from each other in the first direction DR1.

As the first support lines FB3-1 and FB4-1 and the second support lines FB3-2 and FB4-2 are alternately arranged along the first direction DR1 and the second direction DR2, the support plate 610-B according to an embodiment of the inventive concept shown in FIG. 9 may define openings 613 and 614. Among the openings 613 and 614, openings overlapping the non-folding regions 1000A1 and 1000A3 may be defined as first openings 613, and openings overlapping the folding region 1000A2 may be defined as second openings 614.

FIG. 10 is a plan view of a support plate according to an embodiment of the inventive concept. The same/similar reference numerals are used for the same/similar components as those described with reference to FIG. 1A to FIG. 5, and for convenience of explanation, redundant descriptions thereof are omitted.

A support plate 610-C according to an embodiment of the inventive concept shown in FIG. 10 may have a planar shape defined by the first direction DR1 and the second direction DR2. The support plate 610-C may include first support lines FB5-1 and FB6-1 and second support lines FB5-2 and FB6-2.

Each of the first support lines FB5-1 and FB6-1 may extend in a fourth direction DR4, and may be spaced apart from each other along a fifth direction DR5. Each of the second support lines FB5-2 and FB6-2 may extend in the fifth direction DR5, and may be spaced apart from each other along the fourth direction DR4.

As the first support lines FB5-1 and FB6-1 and the second support lines FB5-2 and FB6-2 are alternately arranged along the fourth direction DR4 and the fifth direction DR5, the support plate 610-C according to an embodiment of the inventive concept shown in FIG. 10 may define openings 615 and 616. Among the openings 615 and 616, openings overlapping the non-folding regions 1000A1 and 1000A3 may be defined as first openings 615, and openings overlapping the folding region 1000A2 may be defined as second openings 616.

In an embodiment of the inventive concept shown in FIG. 10, each of the openings 615 and 616 may have a rhombic shape inclined with respect to a plane defined by the first direction DR1 and the second direction DR2.

According to embodiments of the inventive concept, a support plate disposed on a lower portion of a display panel includes a plurality of openings having different areas in non-folding regions and in a folding region. As a result, when an electronic device is folded, the shape thereof may be easily changed in the folding region. Accordingly, an electronic device with improved folding properties may be provided.

While the inventive concept has been particularly shown and described with reference to embodiments thereof, it will be understood by those of ordinary skill in the art that various changes in form and detail may be made therein without departing from the spirit and scope of the inventive concept as defined by the following claims.

What is claimed is:

1. An electronic device, comprising:
a display panel comprising a plurality of non-folding regions arranged along a first direction, and a folding region disposed between the non-folding regions,
wherein the folding region is foldable along a virtual folding axis extending along a second direction crossing the first direction; and
a support plate disposed on a lower portion of the display panel, and comprising a plurality of first support lines extending in the first direction and a plurality of second support lines extending in the second direction and crossing the first support lines, wherein
in the non-folding regions, the first support lines and the second support lines define a plurality of first opening by crossing each other,
in the folding region, the first support lines and the second support lines define a plurality of second openings by crossing each other, and
an area of each of the first openings is different from an area of each of the second openings.

2. The electronic device of claim 1, wherein among the second support lines disposed in the folding region, a distance in the first direction between adjacent second support lines is about 50 um to about 150 um.

3. The electronic device of claim 2, wherein among the second support lines disposed in the non-folding regions, a distance in the first direction between adjacent second support lines is about 10 um or less.

4. The electronic device of claim 1, wherein a density of the first support lines and a density of the second support lines are relatively higher in the non-folding regions than in the folding region.

5. The electronic device of claim 1, wherein the support plate has a weave shape in which the first support lines and the second support lines are alternately arranged in the first direction and the second direction.

6. The electronic device of claim 1, wherein the support plate comprises at least one of polyethylene terephthalate (PET), nylon, acrylic, or spandex.

7. The electronic device of claim 1, wherein an area of a cross-section of each of the first support lines and an area of a cross-section of each of the second support lines are the same.

8. The electronic device of claim 1, wherein an area of a cross-section of each of the first support lines and an area of a cross-section of each of the second support lines are about 50 um to about 200 um.

9. The electronic device of claim 1, further comprising:
a cushion member disposed between the display panel and the support plate.

10. The electronic device of claim 9, further comprising:
a lower protective film disposed between the display panel and the cushion member.

11. The electronic device of claim 1, wherein the support plate has a plate shape.

12. An electronic device, comprising:
a display panel comprising a plurality of non-folding regions arranged along a first direction, and a folding region disposed between the non-folding regions,
wherein the folding region is foldable along a virtual folding axis extending along a second direction crossing the first direction; and
a support plate disposed on a lower portion of the display panel, and having a weave shape in which a plurality of first openings overlapping the non-folding regions and a plurality of second openings overlapping the folding region are defined,
wherein an area of each of the first openings is smaller than an area of each of the second openings.

13. The electronic device of claim 12, wherein the support plate comprises:
a plurality of first support lines extending in the first direction; and
a plurality of second support lines extending in the second direction and crossing the first support lines,
wherein the first openings and the second openings are formed by alternately arranging the first support lines and the second support lines in the first direction and the second direction.

14. The electronic device of claim 13, wherein the second support lines are disposed in the non-folding regions and the folding region, and among the second support lines disposed in the folding region, a distance in the first direction between adjacent second support lines is about 50 um to about 150 um.

15. The electronic device of claim 14, wherein among the second support lines disposed in the non-folding regions, a distance in the first direction between adjacent second support lines is about 10 um or less.

16. The electronic device of claim 13, wherein a density of the first support lines and a density of the second support lines are relatively higher in the non-folding regions than in the folding region.

17. The electronic device of claim 12, wherein the support plate comprises at least one of polyethylene terephthalate (PET), nylon, acrylic, or spandex.

18. The electronic device of claim 13, wherein a width on a cross-section of each of the first support lines and a width on a cross-section of each of the second support lines are about 50 um to about 200 um.

19. The electronic device of claim 12, wherein the support plate has a plate shape.

20. The electronic device of claim 12, wherein at least one of the first openings and the second openings has a rhombic shape inclined with respect to a plane defined by the first direction and the second direction.

* * * * *